United States Patent [19]

Clum et al.

[11] Patent Number: 5,294,351

[45] Date of Patent: Mar. 15, 1994

[54] METHOD FOR CONTROLLING ZEBRA MUSSELS IN POWER AND WATER PLANTS

[75] Inventors: David N. Clum, Higdon, Ala.; Frederick Krosner, Signal Mountain; Jewel R. Leak, Jr., Hixson, both of Tenn.

[73] Assignee: First Thermal Systems, Inc., Chattanooga, Tenn.

[21] Appl. No.: 37,349

[22] Filed: Mar. 25, 1993

[51] Int. Cl.$^5$ ............................................. C02F 1/02
[52] U.S. Cl. ........................... 210/774; 210/170; 210/175; 210/696; 210/747; 210/764; 405/127; 422/6; 422/38; 137/236.1; 137/334
[58] Field of Search ............ 210/747, 696, 737, 774, 210/153, 154, 175, 764, 170; 165/134.1; 405/77, 78, 127; 422/905, 387, 198, 6, 38; 137/334, 236.1

[56] References Cited

U.S. PATENT DOCUMENTS 5,062,967  11/1991  Muia et al. ..................... 210/764
5,128,050  7/1992  Gill ................................. 210/764
5,148,777  9/1992  Brockhurst .................... 123/41.15

Primary Examiner—Neil M. McCarthy
Attorney, Agent, or Firm—Alan Ruderman

[57] ABSTRACT

A method and apparatus for controlling zebra mussels in the inlet cell of a utility power plant by isolating a batch of water in the cell from the water supply of a lake or river and the equipment plant by shutting an inlet gate and shutting outlet valves from said cell. The batch of isolated water is thereafter heated to a lethal temperature which is maintained for a sufficient period of time to ensure 100 percent mortality to the zebra mussels within the cell. The water may be maintained in a static condition and heated by a heat exchanger disposed within the cell. Alternatively the water may be fed to a heat exchanger, heated outside the cell, and returned to the cell. The water is heated to a range of approximately 95° F. to 100° F. and held at the heated temperature within the cell for approximately 30 minutes.

13 Claims, 2 Drawing Sheets

METHOD FOR CONTROLLING ZEBRA MUSSELS IN POWER AND WATER PLANTS

BACKGROUND OF THE INVENTION

This invention relates to a method for controlling the entry of zebra mussels into the inlet water to electrical generating plants, water plants and other plants drawing water from rivers, lakes and streams contaminated with zebra mussels, and more particularly to a method of killing the zebra mussels by heating the inlet water prior to entry into the plants.

Dreissena Polymorpha, commonly known as zebra mussels, were unknown in the waters of the United States and Canada prior to 1988. They are indigenous to Europe and it is theorized that these prolific breeders entered the waters of Lake St. Clair when a foreign ship emptied its ballast water. Since then zebra mussels have found their way into the Great Lakes, namely Lake Erie and Lake Ontario and have already been reported in the Ohio and Tennessee river systems. A single female zebra mussel may lay some ten thousand to two million eggs per year which have a four to eight year life cycle comprising four stages: the fertilized egg stage lasting some two to three days, the veliger or larvae stage lasting some two to three weeks, the settling stage and the adult stage which begins at about twelve months. In the veliger stage the zebra mussels are a free swimming planktonic larval which may disperse for miles. It is in this stage that they are small enough to enter through the screens of a power plant such as an electrical utility generating plant and municipal and industrial water plants drawing their water supply from the contaminated rivers and lakes. In the settling stage they are visible to the eye and possess visceral threads, known as byssus, which cling to or attach to almost any solid stationary surface in areas having low velocity currents, e.g., less than approximately seven feet per second. In this stage they attempt to attach or connect onto such surfaces and if a clear surface is not available, they will climb on top of others that are so attached. In this manner they colonize on the condensers and other equipment in such plants and may form into mats or clumps up to five inches thick. The zebra mussels have few natural predators and can stay out of water for substantial periods of time, up to 14 days, merely needing moist or humid areas in which to exist.

The primary use of water in power plants and the like is to cool and condense the steam that passes through the electrical generating turbines. If the steam is not properly condensed, the plant must be shut down. The condensers are large shell and tube heat exchangers which have the cooling water inside the tubes and the steam/condensate on the shell side. Power plants using fresh water taken from the rivers and lakes have been the first to encounter the costs associated with removal of zebra mussels from intakes, piping, pumps, filters and heat exchangers since the zebra mussel clumps that form can choke down areas of the tubes, piping and filters and block the water flow. When this occurs in condenser tubes, for example, the back pressure on the turbines are increased and the overload can trip the turbines. The problem has been so severe that the Electrical Power Research Institute has formed an internal zebra mussel task force and a utility advisory group to help members cope with the zebra mussel problem and to ensure reliability of the utility plants. Extensive research and development is being conducted regarding the zebra mussel problem in an effort to provide solutions which are cost effective and environmentally acceptable.

Attempts to control the zebra mussel problem to date include: chemical treatment, primarily by injection of chlorine and bromine into the water to discourage veliger settlement within the plant; mechanical cleaning, by water blasting and scraping of the walls in the intake structures and large piping and vacuuming out the removed zebra mussels; coating the pipes with a silicone or other anti-fouling coating; use of biological molluscicide, acoustic energy and other methods including thermal methods of either recirculating the warm water from the condenser and raising its temperature which, when raised to between 95° and 100° F. and held for about 30 minutes, kills the zebra mussels on the screens, grates and tunnels within the plant, or by limited application of electrical resistance heating or steam heating in the piping sections. All of these known methods are either of limited value or costly, or both. For example, mechanical cleaning which provides short term control requires some four or five days for a work crew to perform and can only be done when the facility has been shut down for normal maintenance. The thermal method continually raises the water temperature and, due to environmental regulations, the hot water cannot be released back into the lakes or rivers since there is a maximum temperature at which the water may have on reentry into the lake and river system to prevent damage to existing marine life. Additionally, there are limitations on chemicals and other pollutants that may be exhausted into the rivers and lakes. Thus, the present methods of controlling the zebra mussel problem in electrical utilities are of limited value and research continues to find better methods.

SUMMARY OF THE INVENTION

Consequently, it is a primary object of the present invention to provide an improved method of controlling the entry of zebra mussels into the water supply of electrical utility and water plants so as to reduce the build up of zebra mussels on the surfaces of equipment in such plants.

It is another object of the present invention to provide a method and apparatus for controlling the colonization of zebra mussels on the surface of equipment within electric utility and water plants by heating the water supplied at the entry into such plants while the water is in a substantially isolated condition.

It is a further object of the present invention to provide a method and apparatus for controlling zebra mussels in the water supply to power and water plants by isolating the water prior to entry into the plant equipment, heating the water to a lethal temperature for a sufficient time to kill the zebra mussels in the veliger stage, and thereafter feeding the controlled water for use by the plant equipment.

Accordingly, the present invention provides a method and apparatus for controlling zebra mussels at the inlet to a power plant and the like by isolating the water in the inlet cell of such plants prior to its entering the distribution lines within the plant, the water being held in said inlet cell and heated to a lethal temperature which is maintained for a sufficient time to assure 100 percent mortality to the zebra mussels in any of its life cycle stages. The water is heated while in the inlet cell of the power plants intermediate a large object precluding screen downstream of the supply water, and the water distribution conduits upstream from the condensers and other equipment to be protected. The heating may be by means of a heat exchanger disposed within the isolated water or by feeding the water from one portion of the inlet cell to a heat exchanger out of the isolated water and feeding the heated water back to the inlet cell. The heating plant may be permanent or attached to the system only when required, and in the case of heat exchangers disposed within the isolated water, the heat exchangers themselves may be either permanently or selectively inserted. Preferably the heat exchanger receives a heated fluid medium which is heated by a heating plant including a direct firing heater which may be located at any of a number of locations including locations within or outside the plant.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENT

In accordance with the present invention the water in the inlet cell of the utility or water plant is isolated from the river or lake supply and the downstream distribution lines, heated to a lethal temperature of between approximately 95° and 100° F., held at that temperature for a period of time sufficient to kill any of the zebra mussels in the supply water, whether in the veliger stage or other stage, and then pumped to the distribution lines where the water is supplied to various equipment including the condensers where the water cools and condenses the steam that has been returned from the turbines in a utility plant.

Figure 1:
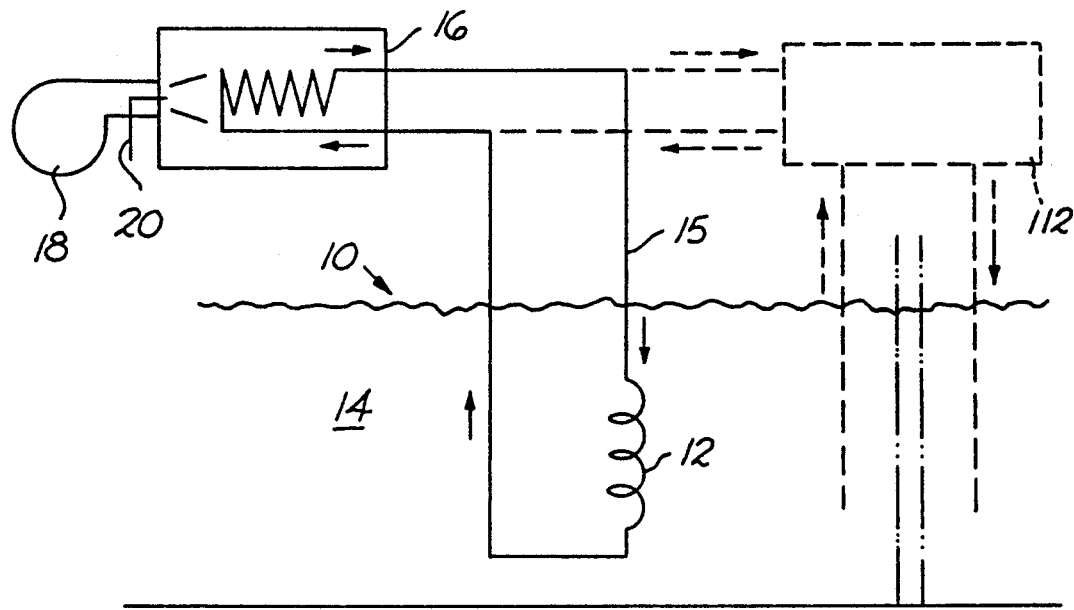
FIG. 1 is a schematic depiction illustrating an overview of the method of the present invention.

Thus, as illustrated in FIG. 1, the inlet cell 10 may have a heat exchanger 12 affixed therein and disposed within the water 14 in one section of the cell and the heat exchanger may be supplied by piping 15 with a heated fluid medium from a heater 16. Alternatively the heat exchanger may be inserted into the inlet cell only during a zebra mussel destruction cycle periodically. The heater 16 may be a direct firing heater, such as the heater described in U.S. Pat. No. 4,357,910, the heater being supplied with air by a compressor 18 and fuel such as gas, oil, coal or other fuel through a supply line 20 or the like. Combustion of the air and fuel occurs within the heater 16 to heat the fluid medium to a high temperature which is pumped to the heat exchanger 12. The heater 16 may be permanently installed within the plant, or it may be mounted on a barge or a trailer and coupled to the heat exchanger only when required.

Figure 2:
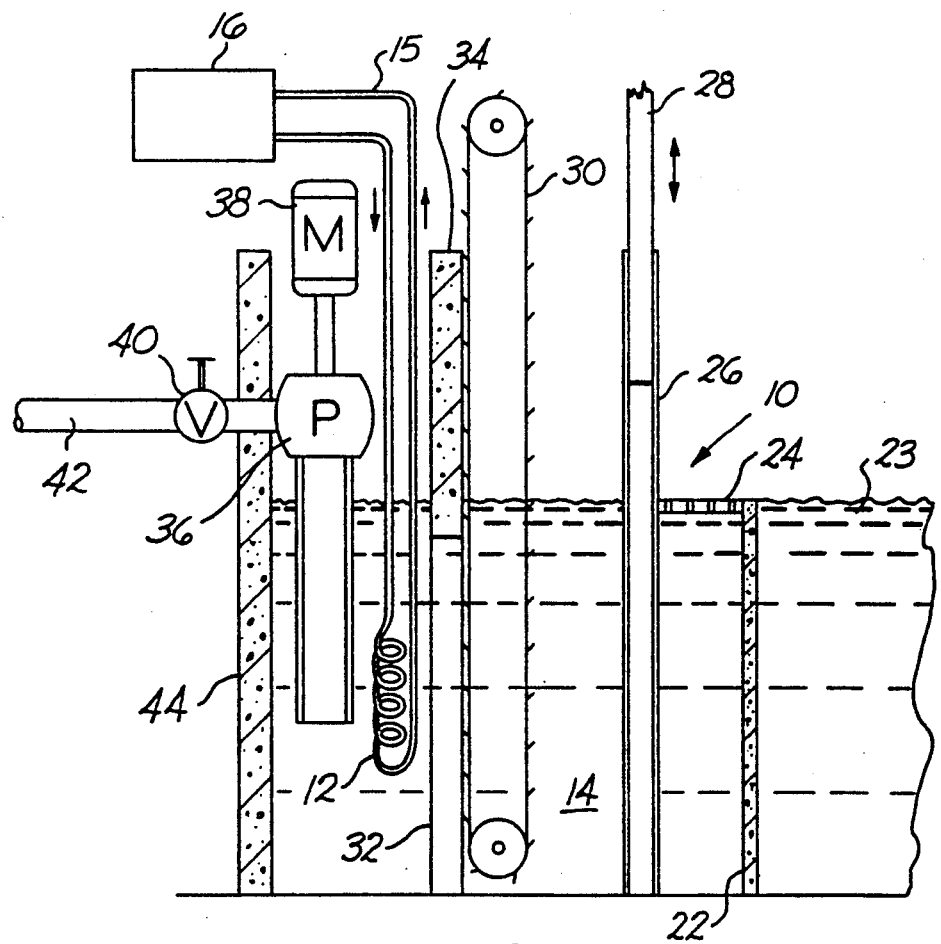
FIG. 2 is a diagrammatic view of the inlet portion of a power plant incorporating one embodiment of the method of the present invention.

As illustrated in FIG. 2, the power plant conventionally includes a baffle wall 22 at the interface of the river or lake 23 with the plant inlet, the top of the wall supporting a grating screen 24 known as a bar grate which prevents large objects from entering the inlet to the plant. Downstream of the bar grate is a gate 26 having a guide structure known as a stop log guide, within which closure members 28 may be inserted in sections to close the water from entering through the stop log guide. The closure members 28, known as stop logs since they originally were wooden logs, are dropped section by section by a crane to a level above that of the bar grate and the river or lake whenever it is desired to shut the flow of water to the plant. Downstream of the stop log guide 26 openings of approximately ⅛ of an inch square and which continuously removes smaller objects that have been drawn through the bar grate 24. After flowing through the traveling screen 30, the water passes through an opening 32 in the bottom of a baffle wall 34 in a second section of the inlet cell, the opening 32 being below the level of the water in the first section where the stop log guide and traveling screen are located. A pump 36 driven by a motor 38 pumps the water from the second section of the inlet through valving 40 to distribution lines or pipes 42 and from the pipes to the condensers or other equipment on which zebra mussels normally colonize resulting in the aforesaid problem within the plant downstream of an interior wall 44 of the inlet cell.

In accordance with the first embodiment of the present invention, the heat exchanger 12 is inserted, either temporarily or permanently, into the inlet cell intermediate the gate 26 and the wall 44. The motor 38 is turned off to shut the pump 36 and the gate 26 is then closed by inserting stop log closure members 28 in the guide 26, and the valving 40 is closed. The water in the inlet cell is thus isolated from the river or lake and the piping 42. The heater 16 is fired to raise the temperature of the water 14 within the inlet cell to approximately 95° to 100° F. and the water is held at that temperature for about 30 minutes or more to ensure a 100 percent mortality to zebra mussels in the water 14. The valving 40 is then opened and the water which has been heated is pumped out through the valving 40 by the pump 36. The gate 26 may then be opened and the process repeated. The process may occur continuously while water in one inlet cell in a plant is isolated and heated and the water in another inlet cell adjacent to the first cell is supplied to the plant equipment.

Figure 3:
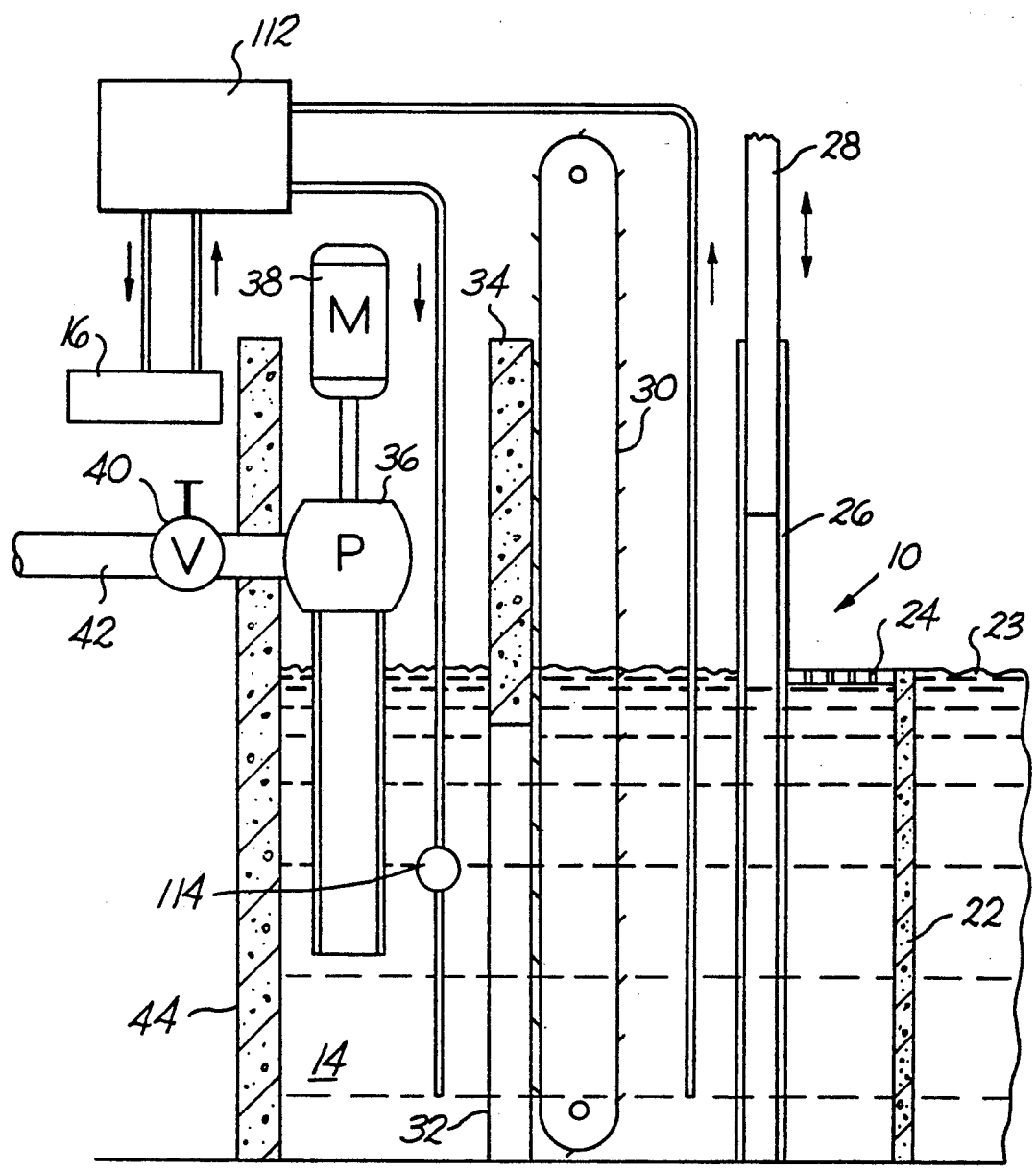
FIG. 3 is a view similar to FIG. 2 illustrating another embodiment of the method of the present invention.

In accordance with a second embodiment of the present invention a heat exchanger 112 may be mounted outside of the inlet cell 10, as illustrated in FIG. 3, and the isolated water 14 in the inlet cell is circulated through the heat exchanger 112. Thus, the water 14 in the inlet cell is heated by the heat exchanger located outside of the isolated water. A pump 114, which may be either a submerged pump as illustrated or an above grade pump, pumps the water from the cell to the heat exchanger and back. In all other respects, the process is the same as that illustrated in FIG. 2.

To protect against the release of high temperature water in quantities sufficient to exceed regulatory limits, the water which has been isolated, after flowing through the condensers and other equipment, may be cooled by evaporation or heat exchange before return to the river or lake. Additionally, to protect against excessive release of dead zebra mussel tissue and shells into a stream, such waste may be treated by high temperature drying and crushing to preclude oxygen depletion and damage to the stream or lake ecology.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A method of controlling zebra mussels entering a utility plant having an inlet cell drawing water from a supply contaminated with zebra mussels and using said water in equipment within the plant downstream of the inlet cell so as to protect said equipment from damage by the zebra mussels, said method comprising:

(a) shutting the flow of water into and out of said inlet cell to isolate and contain a batch of water within said cell;
   (b) heating the batch of isolated water within said cell to raise the temperature of said water to a temperature lethal to said zebra mussels;
   (c) maintaining said batch of isolated water within said cell at said lethal temperature for a period of time sufficient to kill said zebra mussels; and
   (d) thereafter feeding said batch of water out of said inlet cell to said equipment.

2. In the method as recited in claim 1, wherein said water is heated to raise the temperature of the water within said cell to a temperature range of approximately 95° F. to 100° F.

3. In the method as recited in claim 2, wherein said water is maintained for approximately 30 minutes in said temperature range.

4. In the method as recited in claim 1, wherein said heating of said isolated water occurs while said batch of water is maintained static within said inlet cell.

5. In the method as recited in claim 4, wherein said water is heated to raise the temperature of the water within said cell to a temperature range of approximately 95° F. to 100° F.

6. In the method as recited in claim 5, wherein said water is maintained for approximately 30 minutes in said temperature range.

7. A method of controlling zebra mussels entering a utility plant having an inlet cell drawing water from a supply contaminated with zebra mussels and using said water in equipment within the plant downstream of the inlet cell so as to protect said equipment from damage by the zebra mussels, said method comprising:

(a) shutting the flow of water into and out of said inlet cell to isolate and contain a batch of water within said cell;
   (b) heating the batch of isolated water to raise the temperature of said water to a temperature lethal to said zebra mussels;
   (c) maintaining said batch of isolated water within said cell at said lethal temperature for a period of time sufficient to kill said zebra mussels; and
   (d) thereafter feeding said batch of water out of said inlet cell to said equipment.

8. In the method as recited in claim 7, wherein said heating of said isolated water comprises feeding said water to a location outside said cell, heating said water at said location, and returning said water to said cell.

9. In the method as recited in claim 8, wherein said water is heated to raise the temperature of the water within said cell to a temperature range of approximately 95° F. to 100° F.

10. In the method as recited in claim 9, wherein said water is maintained for approximately 30 minutes in said temperature range.

11. Apparatus for controlling zebra mussels entering a utility plant having an inlet cell drawing water from a supply contaminated with zebra mussels and using said water in equipment within the plant downstream of the inlet cell so as to protect said equipment from damage by the zebra mussels, said apparatus comprising gate means for selectively shutting the flow of water into said cell, valve means for selectively shutting and opening the flow of said water out of said cell, whereby a batch of water may be isolated within said cell when said gate means and said valve means are closed, heat exchanger means for heating said batch of water to a temperature lethal to said zebra mussels, and pump means for feeding said water out of said cell upon opening said valve means after a sufficient period of time to kill said zebra mussels.

12. In the apparatus as recited in claim 11, wherein said heat exchanger is disposed within said inlet cell.

13. In the apparatus as recited in claim 11, wherein said heat exchanger is disposed outside of said inlet cell and said apparatus includes pump means for pumping water from said cell through said heat exchanger and back into said cell.

* * * * *